US006923458B2

(12) United States Patent
Hooper et al.

(10) Patent No.: US 6,923,458 B2
(45) Date of Patent: Aug. 2, 2005

(54) COVERED CART ASSEMBLY AND METHODS OF ASSEMBLING AND MAKING THE ASSEMBLY

(75) Inventors: James S. Hooper, Saginaw, MI (US); Jerry J. McQuarter, Jr., Pinconning, MI (US); Susan M. Frank, Pinconning, MI (US)

(73) Assignee: Magline, Inc., Pinconning, MI (US)

( * ) Notice: Subject to any disclaimer, the term of this patent is extended or adjusted under 35 U.S.C. 154(b) by 0 days.

(21) Appl. No.: 10/827,452

(22) Filed: Apr. 19, 2004

(65) Prior Publication Data

US 2005/0001396 A1 Jan. 6, 2005

Related U.S. Application Data

(63) Continuation of application No. 10/228,581, filed on Aug. 27, 2002, now Pat. No. 6,742,792.
(60) Provisional application No. 60/315,561, filed on Aug. 29, 2001.

(51) Int. Cl.$^7$ ................................................. B62B 3/02
(52) U.S. Cl. .................... 280/79.3; 280/47.35; 150/154; 211/180
(58) Field of Search .......................... 280/79.3, 79.11, 280/47.35, 47.34, 47.18, 79.2, 762, 770; 150/154; 135/88.01; 211/180

(56) References Cited

U.S. PATENT DOCUMENTS

| | | | | |
|---|---|---|---|---|
| 942,580 A | * | 12/1909 | McGregor et al. .............. 312/3 |
| 1,943,023 A | * | 1/1934 | Langenkamp et al. ..... 280/79.3 |
| 1,957,656 A | * | 5/1934 | Langenkamp et al. ...... 211/182 |
| 3,445,150 A | * | 5/1969 | Zartarian ................. 312/249.8 |
| 3,834,756 A | * | 9/1974 | Grell ........................ 296/136.1 |
| 4,094,526 A | | 6/1978 | Clarke et al. |
| 4,244,411 A | * | 1/1981 | Karlstrom et al. .......... 150/154 |
| 4,948,154 A | * | 8/1990 | Guggenheim ............... 280/79.3 |
| 4,954,384 A | * | 9/1990 | Hartwell ..................... 428/100 |
| 5,090,725 A | * | 2/1992 | Feldner ....................... 280/651 |
| 5,190,305 A | * | 3/1993 | Putman ..................... 280/79.3 |
| 5,199,729 A | * | 4/1993 | Sievert et al. ........... 280/47.35 |
| 5,255,765 A | * | 10/1993 | Schrecongost ............... 190/26 |
| 5,484,150 A | * | 1/1996 | Yasutomi ................... 280/79.3 |
| 5,487,551 A | * | 1/1996 | Kennedy ................. 280/47.19 |
| 5,491,958 A | * | 2/1996 | Hammer ..................... 53/442 |
| 5,626,241 A | * | 5/1997 | Holden ........................ 211/23 |
| 5,749,589 A | * | 5/1998 | Hopkins et al. ......... 280/47.34 |
| 5,875,904 A | * | 3/1999 | Vorstenbosch .............. 211/180 |
| 6,206,385 B1 | * | 3/2001 | Kern et al. .............. 280/47.35 |
| 6,260,566 B1 | * | 7/2001 | LaFave et al. ........... 135/88.01 |
| 6,299,184 B1 | | 10/2001 | Krawczyk |
| 6,520,515 B2 | * | 2/2003 | Krawczyk ................. 280/79.2 |
| 2002/0038941 A1 | * | 4/2002 | Erickson ................... 280/79.2 |
| 2002/0101049 A1 | * | 8/2002 | Krawczyk et al. ......... 280/79.3 |
| 2003/0160409 A1 | * | 8/2003 | Hanson et al. ............. 280/79.3 |
| 2003/0218307 A1 | * | 11/2003 | Anderson et al. .......... 280/79.2 |
| 2003/0218308 A1 | * | 11/2003 | Lamson ..................... 280/79.3 |

* cited by examiner

*Primary Examiner*—J. Allen Shriver
(74) *Attorney, Agent, or Firm*—Reising, Ethington, Barnes, Kisselle & Learman, P.C.

(57) ABSTRACT

A cart assembly for transporting products on a base platform carried on wheels has a canvas wall. Inversely U-shaped front and rear side rail skeleton structures, with vertically spaced cross rails, on the cart define a front to rear extending product compartment between them spanned by the canvas wall. Vertically spaced side straps loop around the side rail structures to correlate with the cross rails and have coupler ends. Straps carrying mating couplers project from the edges of the canvas wall in vertically spaced relation correlating with the cross rails to couple with the couplers on the side straps.

2 Claims, 2 Drawing Sheets

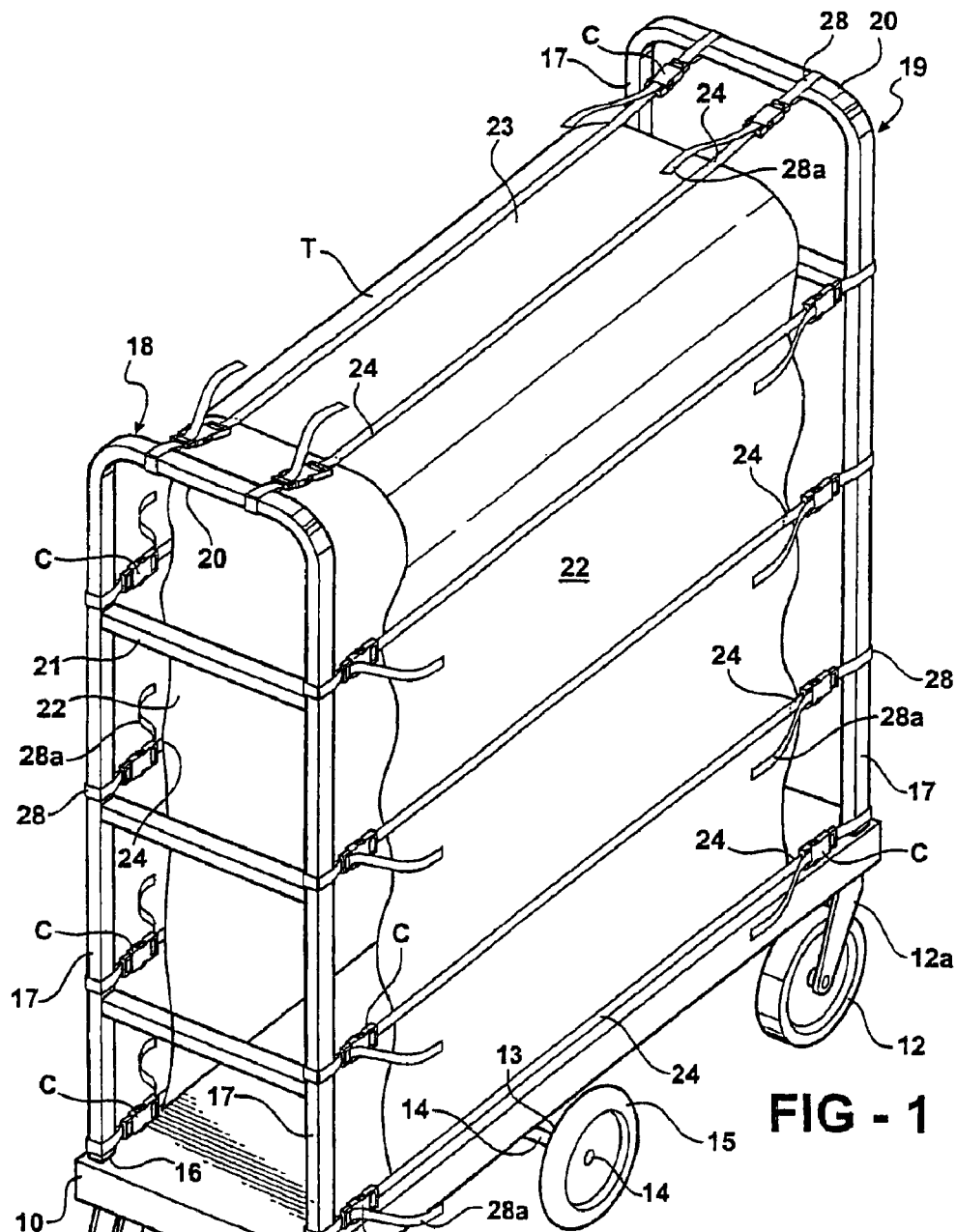
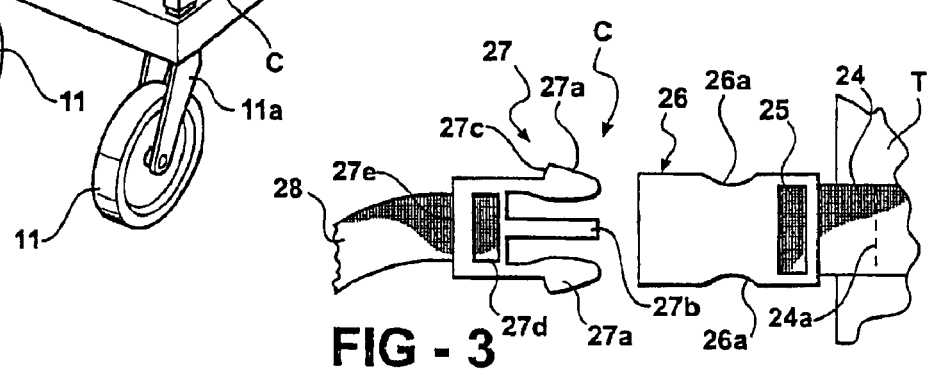
FIG - 1
FIG - 3

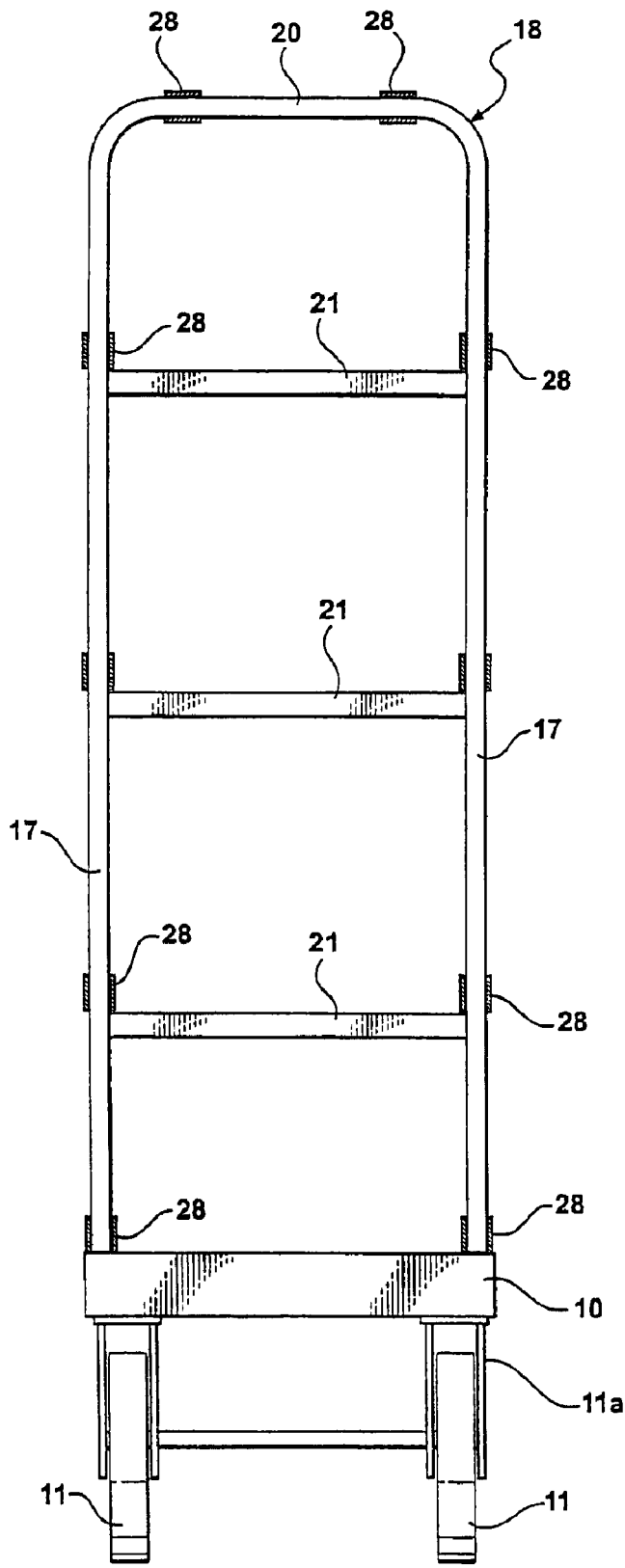
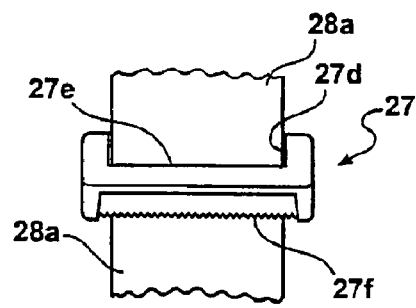
FIG - 2
FIG - 4

COVERED CART ASSEMBLY AND METHODS OF ASSEMBLING AND MAKING THE ASSEMBLY

FIELD OF THE INVENTION

This application is a continuing patent application of application Ser. No. 10/228,581, filed Aug. 27, 2002, now U.S. Pat. No. 6,742,792, which claims priority of provisional patent application Ser. No. 60/315,561, filed Aug. 29, 2001.

This invention relates generally to the manufacture and assembly of covered carts for transporting products of varying description.

BACKGROUND OF THE INVENTION

Presently, castered carts are known for transporting diverse products such as stacked cases of beverage containers or cartons, for example, from manufacturing or distribution centers to trucks which move them to other facilities such as retailing facilities. Such carts normally have skeletal front and rear end frames extending upwardly from a base platform but are otherwise open to the elements. In the past, closures or tarps of canvas or like material, have been used to enclose the load and protect it from the elements. The tarp was however not, to our knowledge, integrated with the cart end walls in the manner to be described to function as top and side walls in a manner to efficiently mitigate load shifting.

SUMMARY OF THE INVENTION

A transport delivery system assembly according to the present invention employs a releasable flexible tarp cover to protect the load. The flexible and pliant cover integrates with the cart front and rear end rail structures, which include side rails and have a plurality of vertically spaced cross braces. Strap mounted coupler parts projecting at spaced intervals from the front and rear edges of the tarp disengageably couple with mating coupler parts provided on straps which are looped around the end rail structures at the cross braces.

BRIEF DESCRIPTION OF DRAWINGS

These and other objects, features and advantages will become more readily apparent in view of the following detailed description and best mode, appended claims and accompanying drawings, in which:

FIG. 1 is FIG. 1 is a schematic perspective front elevational view of a typical cart with the cart tarp or cover secured in position, the stacked products normally carried on the cart when the tarp is in secured position being omitted from the view in the interest of clarity;

FIG. 2 is an enlarged, partly sectional, schematic, front elevational view with certain parts being omitted;

FIG. 3 is an enlarged schematic fragmentary top plan view of typical coupler elements in disengaged position; and FIG. 4 is a considerably enlarged schematic fragmentary top plan view of the free end of a strap securing to the top rail portion of the cart extending through its strap coupler part.

DETAILED DESCRIPTION OF THE PREFERRED EMBODIMENT

Referring now more particularly to the accompanying drawings and in the first instance to FIGS. 1 and 2 particularly, a typical cart is shown as having a base or platform 10 supported on front castered wheels 11 and rear castered wheels 12 which are carried on caster frames 11a and 12a. Intermediately, brackets 13 depend from the base platform 10 to support a dead axle 14 on which noncastered wheels 15 are received. Provided in the base platform 10 at its corners are sockets 16 for snugly receiving the free lower ends of the side rail portions 17 of front and rear inversely U-shaped front and rear end rail structures generally designated 18 and 19 respectively. The rail sections 17 may have the cross-sectional configuration of the side rails of the hand truck disclosed in the present assignee's U.S. Pat. Nos. 4,762,333 or 5,393,081, and the sockets 16 are of a mating configuration. Rail structures 18 and 19 each include the side rail portions 17, top rail portions 20, and vertically spaced cross braces 21 which fixedly bolt or otherwise secure to the side rail portions 17.

A tarp or cover, generally designated T, is provided to form the top and side walls of the cart when the cart is in transport condition. Typically, the tarp T may be formed of a woven synthetic plastic fabric such as a polyvinyl chloride canvas or other suitable cover. It is used in inversely U-shaped configuration, draped over the load to be carried, in the manner indicated in FIG. 1, and supported by the end rail structures 18 and 19. The tarp T is secured in a manner to prevent load shifting and provides load enclosing side and top walls 22 and 23 respectively. Preferably, the one piece tarp material will be opaque and fashioned of a relatively heavy gauge material.

As FIG. 1 particularly shows, fabric reinforcing webbing or straps extend at spaced intervals as at 24 from the front edge of the tarp T to the rear edge thereof and project a given distance forwardly and rearwardly therefrom. These ends of the straps 24 then loop around the integrated eye or ring portions 25 (FIG. 3) provided on socket coupler parts generally designated 26 and return to be sewn or secured to the body of the straps 24 as at 24a. The socket coupler elements 26 are part of an overall conventional coupler assembly, generally designated C, which includes the usual male coupler fitting or part or portion generally designated 27 which has projecting resilient lock detents or prongs 27a which are cammed inwardly as they are received within the socket coupler part 26. The part 27 also includes the guide part 27b which cooperates with guide surfaces within socket part 26.

The coupler system C may comprise the well known Velcro 500 fastener system wherein the spring legs or detents 27a are forced inwardly when moved into the socket 26 and then are permitted to spring outwardly through locking openings 26a in the sides of the socket part 26 to releasably lock in position. In coupling systems of this character, the middle member 27b is simply a guide member and the spring legs or detents 27a, which have the locking shoulders 27c locking on the front edges of openings 26a, are released when they are grasped and pressed laterally inwardly into the openings 26a. Other similar coupler systems may be utilized as well as the Velcro 500 system manufactured by Velcro U.S.A. Incorporated in the United States.

Coupler system straps or belts 28 are secured around the buckle eyes generally designated 27d of the male couplers 27 and, as FIGS. 1 and 2 indicate, loop around the front and back rail structures 18 and 19. The free ends 28a of straps 28 then return to the coupler buckle eyes or parts 27d of the male couplers 27, passing in under the buckle eye bar 27e thereof so as to be engaged by the projecting teeth 27f which may be provided thereon. With the teeth 27f releasably preventing withdrawal from the eyes 27d, the free end 28a of each coupler or strap 28 can be pulled through a coupler buckle eye 27d to a tightened or taut position and the free end of the tightened strap 28 will then be releasably held in place by the coupler teeth 27f. As indicated, the coupler system employed may be any one of a number of conventional systems such as the similar YKK System, and even ordinary belt buckles, for example, could conceivably be employed. Because of the coupler parts 26 and 27, the straps 28 can remain in position looped around the side rail portions 17 and top rail portions 20 of the front and rear rail structures 18 and 19, unless the tarp T is to be completely disengaged.

Normally, to load the cart, only one side portion 22 of the tarp may be disengaged by disconnecting its coupler parts 26 and 27, and simply lifting it upwardly and depositing it over the top rail portions 20 to drape upon the opposite engaged side portion 22. Then, loading of the platform 10 can take place, and when this has been accomplished, the freed side wall 22 may be brought down into position once again and the male and female couplers 26 and 27 reengaged. The weight of the tarp T, which may be in the neighborhood of 9 pounds, for example, bears down on the cross rails 21 to restrain the load shifting which normally commences at the upper end of a stack of products. With this structure, the weight also does not stress the couplers C, and this enables ready disengagement of the couplers C and does not impose forces upon them which would tend to shorten their service lives.

The enclosed embodiment is representative of a presently preferred form of the invention, but is intended to be illustrative rather than definitive thereof. The invention is defined in the claims.

We claim:

1. A covered merchandise cart assembly for transporting products including:

a cart comprising an elongate base platform carried on front and rear end wheels;

inversely U-shaped front and rear rail structures with top rail portions and vertical side rail portions fixedly secured to the front end of the platform and to the rear end of the platform, and defining a product carrying compartment between them;

generally horizontally disposed cross rails on said side rail portions of the front and rear rail structures;

vertically spaced apart side straps looped around said side rail portions above said cross rails, said straps being spaced apart substantially to lie upon and be vertically supported by said cross rails and having free ends with couplers thereon;

a flexible fabric member secured to said rail structures; and cover straps carrying mating couplers secured to project generally horizontally from said fabric member in spaced relation substantially correlating with said cross rails to couple with said couplers on said straps looped around said side rail portions.

2. A merchandise cart assembly for transporting products including:

a cart comprising an elongate base platform carried on front and rear end wheels;

inversely U-shaped front and rear rail structures with top rail portions and vertical side rail portions fixedly secured to the front end of the platform and to the rear end of the platform, and defining a front to rear extending product carrying compartment between them;

said front and rear rail structures including generally horizontally disposed cross rails on said side rail portions of the front and rear rail structures;

vertically spaced apart rail structure side straps looped around said side rail portions to substantially correlate with said cross rails and having free ends with couplers thereon;

a flexible fabric cover to be releasably secured to said rail structures; and cover straps carrying mating couplers secured to project generally horizontally from said fabric cover in vertically spaced relation substantially correlating with said side straps to couple with said couplers on said side straps looped around said side rail portions.

* * * * *